(12) United States Patent
Jung et al.

(10) Patent No.: US 9,706,590 B2
(45) Date of Patent: Jul. 11, 2017

(54) METHOD AND APPARATUS FOR WI-FI DIRECT CONNECTION

(71) Applicant: Samsung Electronics Co., Ltd., Suwon-si, Gyeonggi-do (KR)

(72) Inventors: Buseop Jung, Suwon-si (KR); Seongbin Kim, Seoul (KR); Jungchul Park, Yongin-si (KR); Sungkwang Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 234 days.

(21) Appl. No.: 14/454,158

(22) Filed: Aug. 7, 2014

(65) Prior Publication Data
US 2015/0043484 A1    Feb. 12, 2015

(30) Foreign Application Priority Data

Aug. 8, 2013    (KR) ........................ 10-2013-0093956

(51) Int. Cl.
*H04W 76/02*    (2009.01)
*H04W 76/00*    (2009.01)
(Continued)

(52) U.S. Cl.
CPC ....... *H04W 76/023* (2013.01); *H04W 76/002* (2013.01); *H04W 8/186* (2013.01); *H04W 84/12* (2013.01)

(58) Field of Classification Search
CPC ... H04W 76/023; H04W 4/008; H04W 84/12; H04W 8/005; H04W 4/08; H04W 84/20;
(Continued)

(56) References Cited

U.S. PATENT DOCUMENTS

2002/0044549 A1*  4/2002  Johansson ............... H04L 45/02
                                                   370/386
2004/0063455 A1*  4/2004  Eran ................... H04J 13/0048
                                                   455/525
(Continued)

FOREIGN PATENT DOCUMENTS

EP    2 557 825 A2    2/2013
EP    2 600 679 A1    6/2013
(Continued)

OTHER PUBLICATIONS

Shih et al., A Bluetooth Group-Scatternet Formation Algorithm for Efficient Routing, Department of Computer Science and Information Engineering, Tamkang University, Taipei, Taiwan.

*Primary Examiner* — Charles C Jiang
*Assistant Examiner* — Will Lin
(74) *Attorney, Agent, or Firm* — Jefferson IP Law, LLP

(57) ABSTRACT

A method and apparatus for a Wi-Fi direct connection are provided. The method for a Wi-Fi direct connection includes detecting an event for a group connection, determining whether a terminal belongs to a first group when the event for the group connection is detected, determining an operation mode within the first group when the terminal belongs to the group, exchanging group information or terminal information according to the determined operation mode within the first group, and comparing exchanged information, generating a new group according to the operation mode within the new group based on the compared information, and connecting the new group through a group reset according to the operation mode within the new group when the new group generation is completed.

20 Claims, 9 Drawing Sheets

(51) Int. Cl.
  *H04L 12/50* (2006.01)
  *H04W 84/12* (2009.01)
  *H04W 8/18* (2009.01)

(58) Field of Classification Search
  CPC ... H04W 84/18; H04W 92/18; H04W 76/043;
       H04L 67/104; H04L 67/1051; H04N
       2201/006
  USPC .............. 370/331, 395.2; 455/41.1, 41.2
  See application file for complete search history.

(56) References Cited

U.S. PATENT DOCUMENTS

| | | | |
|---|---|---|---|
| 2008/0219227 A1 | 9/2008 | Michaelis | |
| 2010/0150122 A1* | 6/2010 | Berger | H04W 4/02 370/338 |
| 2011/0210820 A1 | 9/2011 | Talty et al. | |
| 2011/0210831 A1 | 9/2011 | Talty et al. | |
| 2012/0120934 A1* | 5/2012 | Cho | H04W 40/24 370/338 |
| 2012/0134349 A1 | 5/2012 | Jung et al. | |
| 2012/0204253 A1* | 8/2012 | Sugimoto | H04L 12/4633 726/12 |
| 2012/0208461 A1 | 8/2012 | Choi et al. | |
| 2012/0214414 A1 | 8/2012 | Abel et al. | |
| 2013/0034023 A1 | 2/2013 | Jung | |
| 2013/0040576 A1 | 2/2013 | Yoon | |
| 2013/0137373 A1 | 5/2013 | Choi et al. | |
| 2013/0309971 A1* | 11/2013 | Kiukkonen | H04L 63/107 455/41.2 |
| 2014/0078928 A1* | 3/2014 | Verma | H04W 84/20 370/254 |
| 2014/0126461 A1* | 5/2014 | Ghosh | H04W 88/04 370/315 |
| 2014/0206407 A1 | 7/2014 | Kim et al. | |
| 2014/0254558 A1* | 9/2014 | Kasslin | H04W 36/36 370/331 |
| 2014/0314059 A1 | 10/2014 | Yoon et al. | |
| 2014/0314065 A1 | 10/2014 | Song et al. | |
| 2015/0215861 A1* | 7/2015 | Kim | H04W 4/005 370/338 |
| 2015/0245393 A1* | 8/2015 | Lee | H04W 8/005 370/338 |

FOREIGN PATENT DOCUMENTS

| | | |
|---|---|---|
| KR | 10-2012-0119959 A | 11/2012 |
| WO | 2008/103945 A1 | 8/2008 |
| WO | 2013/035999 A1 | 3/2013 |
| WO | 2013/073838 A1 | 5/2013 |

* cited by examiner

METHOD AND APPARATUS FOR WI-FI DIRECT CONNECTION

CROSS-REFERENCE TO RELATED APPLICATION(S)

This application claims the benefit under 35 U.S.C. §119(a) of a Korean patent application filed on Aug. 8, 2013 in the Korean Intellectual Property Office and assigned Serial number 10-2013-0093956, the entire disclosure of which is hereby incorporated by reference.

TECHNICAL FIELD

The present disclosure relates to a method and an apparatus for a Wi-Fi direct connection. More particularly, the present disclosure relates to a method and an apparatus for a Wi-Fi direct connection which may communicate by connecting to various devices (e.g., a portable terminal, an audio, a TV, and the like) and a Wi-Fi Direct without disconnecting an existing group connection through an event for a group connection (e.g., Near Field Communication (NFC) or a Bluetooth Low Energy (BLE), etc.).

BACKGROUND

Recently, a portable terminal may communicate with a device by connecting to a Wi-Fi direct. However, when the portable terminal connects to a new device while connecting to an existing device, the portable terminal may disconnect to the existing device and connect to the new device. In order to communicate with various devices, the portable terminal should disconnect to the existing device, and may communicate by connecting to the new device. Thus, there is an inconvenience to manipulate a connection operation several times in order to connect to the new device by using the Wi-Fi direct.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for Wi-Fi direct connection that may connect by expanding a group connection without disconnecting an existing connection when an event for an additional group connection is detected in a group state.

In accordance with an aspect of the present disclosure, a method for a Wi-Fi direct connection is provided. The method includes detecting an event for a group connection, determining whether a terminal belongs to a first group when the event for group connection is detected, determining an operation mode within the first group when the terminal belongs to the first group, exchanging group information or terminal information according to the determined operation mode within the first group, and comparing exchanged information, generating a new group according to the operation mode within the first group based on the compared information, and connecting a new group through a group reset according to an operation mode within the new group when the new group generation is completed.

In accordance with another aspect of the present disclosure, an apparatus for a Wi-Fi direct connection is provided. The apparatus includes a wireless LAN module configured to form the Wi-Fi direct connection between portable terminals, a short distance communication module configured to detect an event for a group connection, a controller configured to detect the event for the group connection, to exchange group information or terminal information when the event is detected, to compare the exchanged information for determination of a master group, to generate a new group when the master group is determined, and to connect the new group through a group reset according to the an operation mode within the new group when the new group generation is completed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to a detailed description, a portable terminal according to an embodiment of the present disclosure may include all devices using an Application Processor (AP), a Graphic Processing Unit (GPU), and a Central Processing Unit (CPU) such as all information communication device and a multimedia device supporting a function of the present disclosure, and a corresponding application device. For example, the portable terminal may include a smart phone equipped with a wireless LAN function and a short range communication function, a Personal Digital Assistant (PDA), a Tablet Personal Computer (PC), and a Portable Multimedia Player (PMP), etc.

Figure 1:
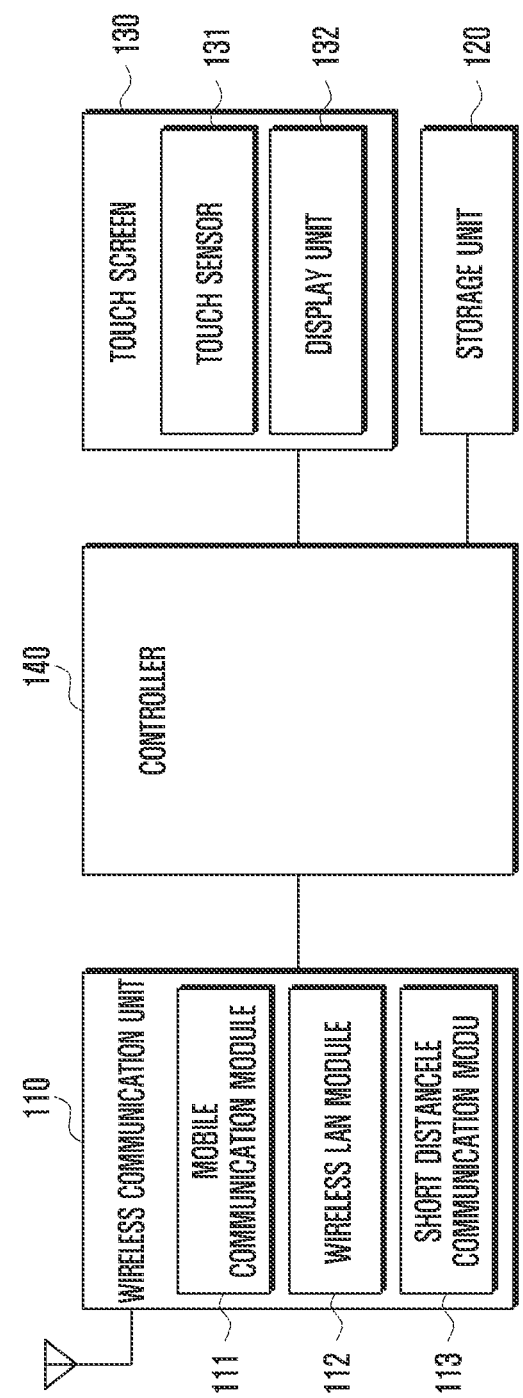
FIG. 1 is a block diagram illustrating a configuration of a portable terminal according to an embodiment of the present disclosure.

FIG. 1 is a block diagram illustrating a configuration of a portable terminal according to an embodiment of the present disclosure.

Referring to FIG. 1, the portable terminal of the present disclosure may include a wireless communication unit 110, a storage unit 120, a touch screen 130, and a controller 140.

The wireless communication unit 110 may include one or more modules that enable a wireless communication between the portable terminal and a wireless communication system, or between the portable terminal and a user device. For example, the wireless communication unit 110 may include a mobile communication module 111, a Wireless Local Area Network (WLAN) module 112, and a short distance communication module 113, and may include other modules not illustrated.

The mobile communication module 111 may transmit/receive a wireless signal with at least one of a base station, an external device, or various servers (e.g., an integration server, a provider server, a content server, an internet server, and a cloud server, etc.) on a mobile communication network. The wireless signal may include various types of data according to a voice call signal, a video call signal, or a text/multimedia message transmission/reception.

The wireless LAN module 112 indicates a module to form a wireless internet connection and a wireless LAN link with a user device, and may be built-in or may be operated in the outside of the portable terminal. A Wi-Fi, a Wireless broadband (Wibro), a World interoperability for Microwave Access (WiMAX), and a High Speed Downlink Packet Access (HSDPA) may be used as a wireless internet technology. In addition, the wireless LAN module 112 may transmit or receive the various data (e.g., an image, a video, or a music, etc.) according to a user selection to the user device when the wireless LAN link with the user device is formed. The wireless LAN module 112 may always maintain an on-state, or may be turned-on according to a user setting or an input.

According to an embodiment of the present disclosure, the wireless LAN module 112 may form a connection of Wi-Fi Direct between the portable terminals. Wi-Fi Direct is a technology that provides a direct connection without an existing access point between the portable terminals.

In addition, the wireless LAN module 112 may notify information (e.g., a MAC address) of a terminal which will be newly connected (hereinafter, referred to as a 'newly connectable terminal') and group information (e.g., a MAC address of a portable terminal, a MAC list of a portable terminal within a group, the number of portable terminals within a group, an operation mode of a portable terminal within a group (e.g., a group owner terminal, a group client terminal, a normal terminal), a currently operating channel, a random intent value to determine a group owner terminal, a new group generation flag, an encryption information (credential) used in a current group, and the number of a terminal connectable to an owner terminal) to the terminals (e.g., an owner terminal, a client terminal, etc.) within a group (e.g., a Wi-Fi direct group).

The wireless LAN module 112 may deliver a new group generation progress message and a new group generation completion message to the terminals within the group when connecting to the new group (e.g., newly formed Wi-Fi direct group).

The short distance communication module 113 indicates a module for a short range communication. Bluetooth, Bluetooth Low Energy (BLE), Radio Frequency Identification (RFID), Infrared Data Association (IrDA), Ultra Wideband (UWB), ZigBee, NFC, and the like may be used as a short range communication technology. In addition, the short distance communication module 113 may transmit or receive various data (e.g., images, video, music, or the like) according to a user selection when the short range communication is connected to a user device. The short distance communication module 113 may always maintain an on-state, or may be turned-on according to a user setting or an input.

The short distance communication module 113 may form a connection between the groups and between the portable terminals by detecting an event (e.g., NFC or BLE) for a group connection. In addition, the short distance communication module 113 may transmit/receive group information and terminal information through the event for a group connection. The group information and terminal information may include a MAC address of the portable terminal, a MAC list of the portable terminal within the group, the number of the portable terminals within the group, an operation mode of the portable terminal within the group (e.g., a group owner terminal, a group client terminal, a normal terminal), a currently operating channel, a random intent value to determine a group owner terminal, a new group generation flag, an encryption information used in the current group, and the number of the portable terminals which is connectable to the owner terminal.

The storage unit 120 may store programs and data that are necessary to operate the portable terminal, and may be divided into a program area and a data area. The program area may store a program that controls an overall operation of the portable terminal, an Operating System (OS) that boots the portable terminal, an application program, and the like. The data area is an area where the data that is generated according to the usage of the portable terminal is stored, and may store an image and a video.

According to an embodiment of the present disclosure, the storage unit 120 may store group information and terminal information received through the event for the group connection. The storage unit 120 may store a role of the terminals within the group, and may store a newly connectable terminal received from the terminal within the group and information of group to which the terminal belongs.

The touch screen 130 is an input/output means that performs an input function and a display function simultaneously, and may include a touch sensor 131 and a display unit 132. According to an embodiment of the present disclosure, the touch screen 130 may display a screen (e.g., a short range communication execution screen, a wireless LAN connection setting screen, and a gallery screen, etc.) according to the operation of the portable terminal through the display unit 132. In addition, when a user touch event by the touch sensor 131 is input while displaying a specific screen through the display unit 132, the touch screen 130 may deliver an input signal according to the touch event to the controller 140. The controller 140 may identify the touch event, and may control an operation according to the touch event.

The touch sensor 131 may detect the user touch event (e.g., a tap, a drag, a sweep, a flick, and a multi-touch, etc.) that contacts a surface of the touch screen 130. The touch sensor 131 may detect a coordinate where the touch event has generated when detecting the user touch event on the touch screen 130 surface, and may deliver the detected coordinate to the controller 140. The controller 140 may perform a function corresponding to the area where the touch event by the signal delivered from the touch sensor 131 has generated.

The display unit 132 may display various screens according to a use of the portable terminal. For example, the display unit 132 may provide a menu, an input data, and various information to the user visually. The display unit 132 may be configured with a Liquid Crystal Display (LCD) and an Organic Light Emitting Diodes (OLED), and the like.

The controller 140 may control an overall operation of the portable terminal and a signal flow between the internal configurations of the portable terminal (e.g., the wireless communication unit 110, the storage unit 120, the touch screen 130), and perform a data processing function, and may control a power supply to the configurations from a battery.

According to an embodiment of the present disclosure, the controller 140 may form a connection of Wi-Fi direct by detecting the event for the group connection, and the connected portable terminals may be formed as a single group (e.g., a Wi-Fi direct group). The controller 140 may generate and store group information when forming a group. The controller 140 may verify a Wi-Fi direct connection request through the event for the group connection in a group formed state. In addition, the controller 140 may receive information of another group according to the connection request, and may deliver the existing group information.

When the controller 140 verifies the Wi-Fi direct connection request, the controller may determine an operation mode of the portable terminal within the group. When the controller 140 operates as the owner terminal among the operation modes, the controller may deliver the received group information to the client terminals within the group. In addition, the controller 140 may form a new group according to the connection request. In order to determine the owner terminal of a newly formed group, the controller 140 may compare existing group information with newly connected group information. The comparison to determine the owner terminal may be achieved by comparing the number of the terminals within the group, a random intent value, and the like. The controller 140 enables the owner terminal of the group having high value to be operated as the owner terminal of the newly formed group by comparing the number of the terminals within the group and a random intent value of the owner terminal within the group.

When the owner terminal is determined, the controller 140 may generate a new group (e.g., a new Wi-Fi direct group). The controller 140 may indicate that a new group is in process of a generation through a new group generation flag. The new group generation flag is to block a new group generation operation corresponding to an event for the group connection from another group or another terminal during the new group generation procedure. In addition, the controller 140 may notify the terminal or the group that requested the connection through the event for the group connection during the new generation procedure that the new group is in process of the generation.

When the new group generation is completed, the controller 140 may deliver the new group generation completion message to the group that requested for the connection to the client terminal within the group. The group that requested the connection to the client terminal within the group may receive the completion message, and perform a group reset. The controller 140 may disconnect to a non-responsive terminal in a master group or a slave group according to the number of connectable terminals received from a master group owner terminal, and may connect to a new group at the time of a group reset. In the present disclosure, the group reset is to maintain the existing connection when connecting to the new group, and connect to a newly connectable terminal.

Figure 2:
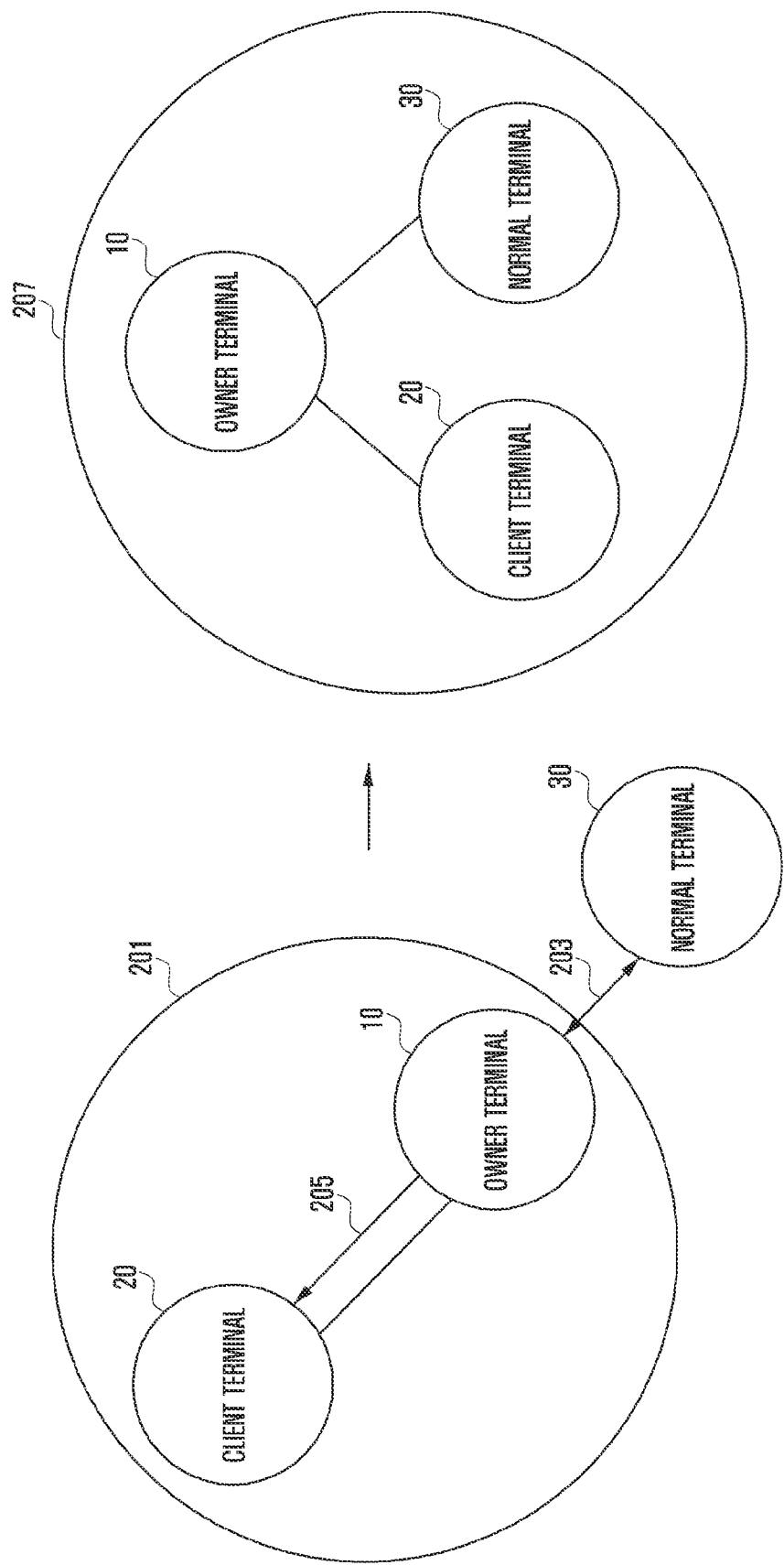
FIG. 2 is a diagram illustrating a case in which a normal terminal is connected to a group to which an owner terminal belongs in a group formation state according to an embodiment of the present disclosure.

FIG. 2 is a diagram illustrating a case in which a normal terminal is connected to a group to which an owner terminal belongs in a group formation state according to an embodiment of the present disclosure.

Referring to FIG. 2, the owner terminal 10 and the client terminal 20 are in a group formation state as shown in 201. The owner terminal 10 and the client terminal 20 may communicate each other by using the Wi-Fi direct in the group formation state.

In the group formed state, the normal terminal 30 may request the Wi-Fi direct connection to the owner terminal 10 through an event for the group connection as shown in 203. The normal terminal 30 may deliver its information (e.g., a MAC address, etc.) to the owner terminal 100 when requesting the Wi-Fi direct connection, and may receive group information (e.g., a MAC address, a MAC list, the number of the portable terminal within the group, an operation mode of the portable terminal within the group, the currently operating channel, a random intent value to determine a group owner terminal, a new group generation flag, encryption information used in the current group, and the number of the terminal that is connectable to the owner terminal, etc.) from the owner terminal 10.

The owner terminal 10 may verify a connection request from the normal terminal 30, and may deliver normal terminal 30 information to the client terminal 20 within the group as shown in 205. The owner terminal 10 and the client terminal 20 may recognize that the normal terminal 30 has requested for the connection to the group to which they belong.

The owner terminal 10 may generate a new group according to the request of the normal terminal 30. The owner terminal 10 may deliver the new group generation progress message. In addition, the owner terminal 10 may notify to each terminal that the new group is in a process of generation through the new group generation flag. Further, even though the new terminal or the group requests the connection through the event for the group connection, the new terminal or the group may deliver to the corresponding terminal that the new group is in process of the generation through the flag.

When the new group generation is completed, the owner terminal 10 may indicate that the new group generation is completed by delivering the new group generation message to each terminal (e.g., the client terminal 20, the normal terminal 30). The client terminal 20 and the normal terminal 30 may perform a group reset after receiving the group generation completion message from the owner terminal 10. The group reset maintains the existing connection when connecting to the new group, and connects to the newly connectable terminal. In addition, the owner terminal 10, the client terminal 20, and the normal terminal 30 may form the new group, and communicate as shown in 207. The normal terminal 30 may form the new group, and be operated as the client terminal within the group.

Figure 3:
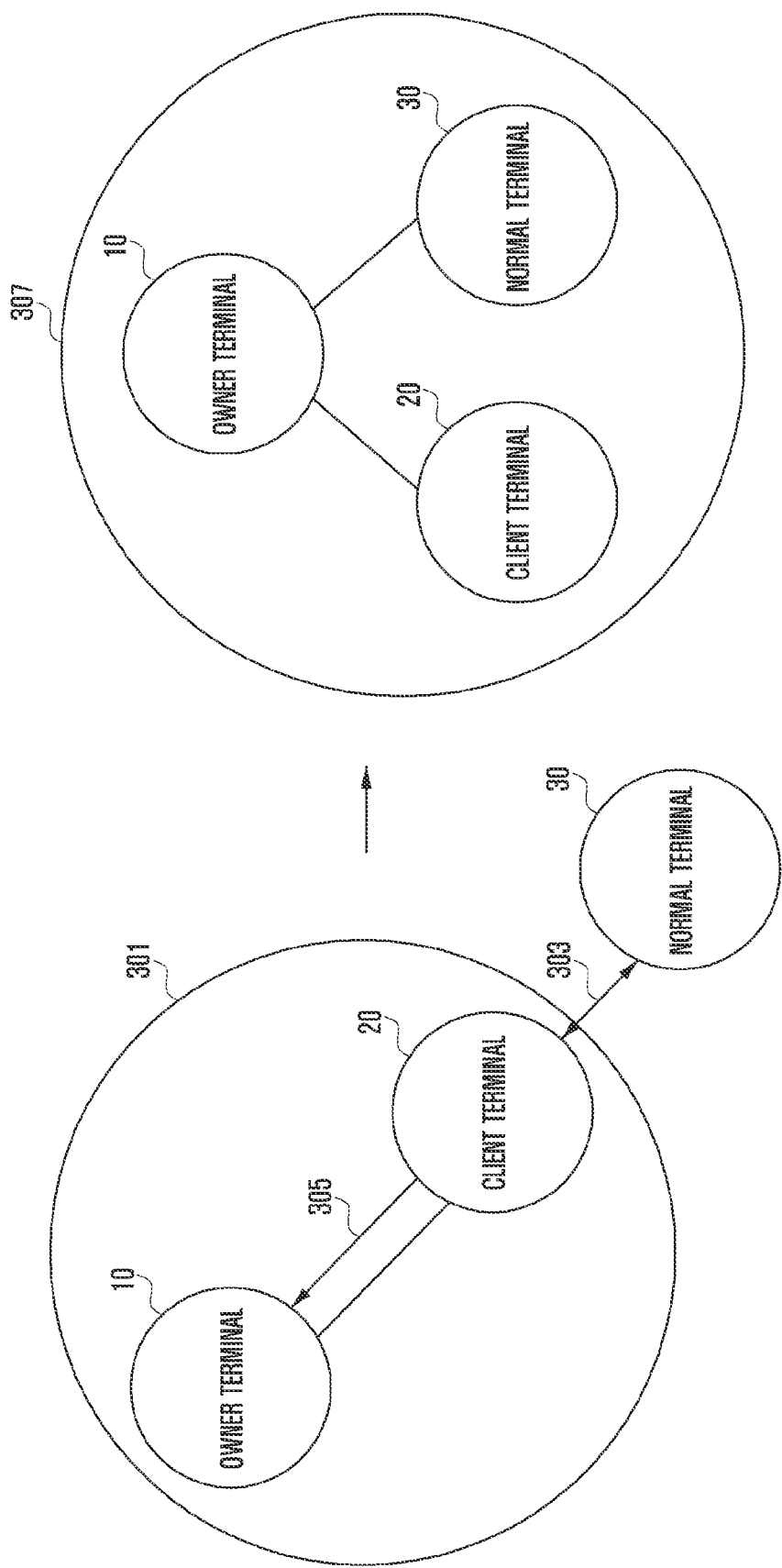
FIG. 3 is a diagram illustrating a case in which a normal terminal is connected to a group to which a client terminal belongs in a group formation state according to an embodiment of the present disclosure.

FIG. 3 is a diagram illustrating a case in which a normal terminal is connected to a group to which a client terminal belongs in a group formation state according to an embodiment of the present disclosure.

Referring to FIG. 3, the owner terminal 10 and the client terminal 20 are in a group formation state as shown in 301. The owner terminal 10 and the client terminal 20 may communicate with each other through the Wi-Fi direct in the group formation state.

In the group formation state, the normal terminal 30 may request for the Wi-Fi direct connection to the client terminal 20 through the event for the group connection as shown in 303. The normal terminal 30 may deliver its own information to the client terminal 20, and may receive group information from the client terminal 20.

The normal terminal 30 may recognize that the normal terminal should be connected to the owner terminal 10 instead of the client terminal 20 for the Wi-Fi direct connection through the received group information. The owner terminal 10 may receive newly connectable normal terminal 30 information from the client terminal 20. In addition, since the owner terminal 10 is aware of newly connectable normal terminal 30 information, the owner terminal 10 may not connect by generating the event for the group connection again, but may connect automatically.

The client terminal 20 may verify the connection request from the normal terminal 30, and may deliver normal terminal 30 information to the owner terminal 20 within the group as shown in 305. The owner terminal 10 and the client terminal 20 may recognize that the normal terminal 30 has requested the connection to the group to which they belong.

The owner terminal 10 may generate a new group according to the request of the normal terminal 30. The owner terminal 10 may deliver the new group generation progress message to all terminals. In addition, the owner terminal 10 may notify each terminal that the new group is in process of the generation through the new group generation flag. Further, even though the new terminal or the group requests the connection through the event for the group connection, the owner terminal 10 may notify the corresponding terminal that the new group is in process of the generation through the flag.

When the new group generation is completed, the owner terminal 10 may deliver the message to each terminal (e.g., the client terminal 20, the normal terminal 30) and notifies that the new group generation is completed. The client terminal 20 and the normal terminal 30 may perform a group reset after receiving the new group generation completion message from the owner terminal 10. In addition, the owner terminal 10, the client terminal 20, and the normal terminal 30 may form a new group to communicate as shown in 307. The normal terminal 30 forms the new group, and may be operated as the client terminal within the group.

Figure 4:
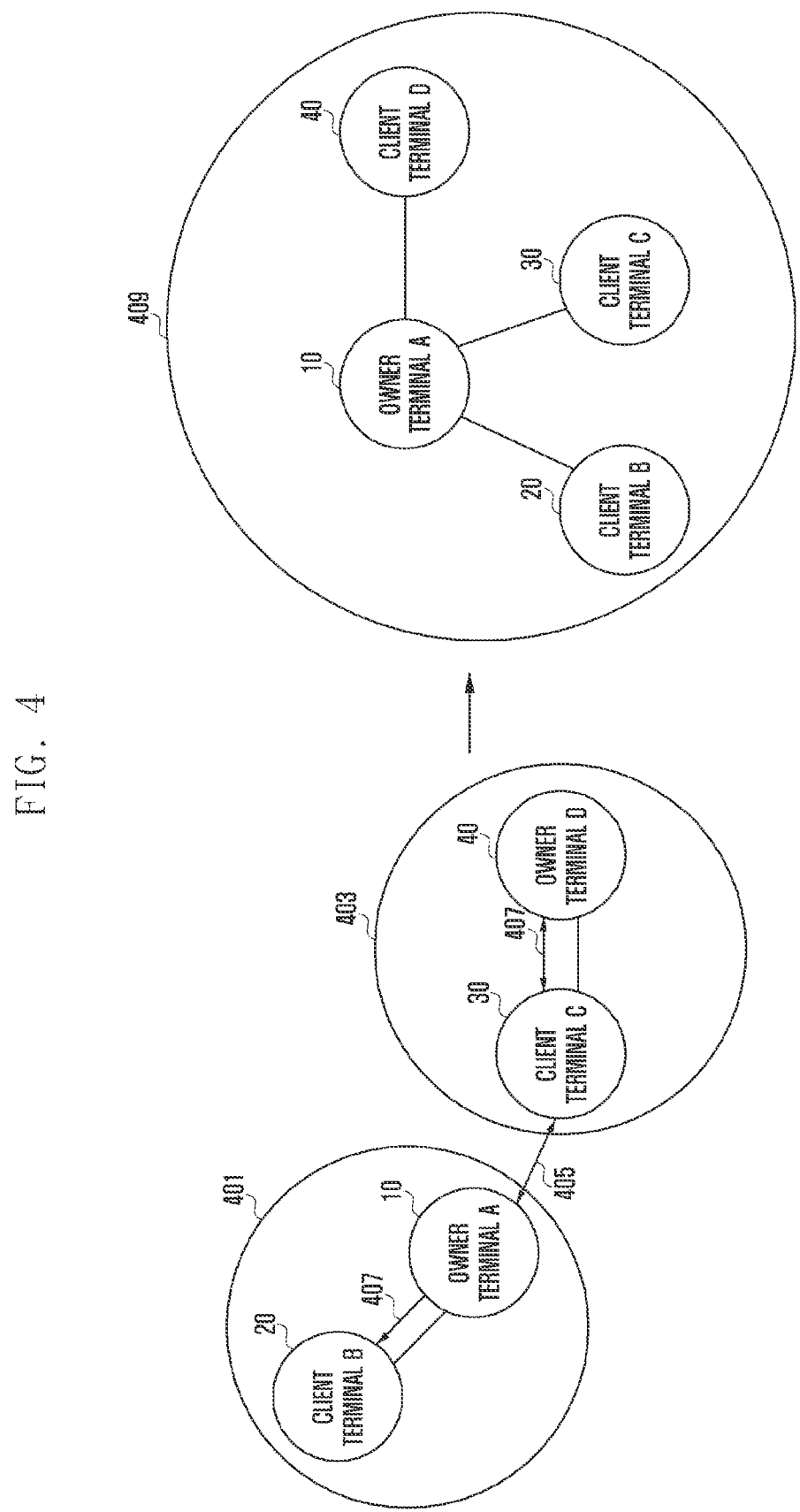
FIGS. 4, 5, and 6 are diagrams illustrating a case in which a connection is formed between groups in a group formation state according to an embodiment of the present disclosure.

FIG. 4 is a diagram illustrating a case in which a connection is formed between groups in a group formation state according to an embodiment of the present disclosure.

Referring to FIG. 4, in order to form a connection between the groups, one of two groups may be determined as a master group to accept the connection to a slave group. The master group is a group accepting the Wi-Fi direct connection, and the slave group is a group requesting for the Wi-Fi direct connection.

FIG. 4 illustrates that the owner terminal may have a priority to be determined as the master group when an owner terminal A 10 and a client terminal C 30 form a connection between the groups through the event for the group connection.

Referring to FIG. 4, the owner terminal A 10 and the client terminal B 20 may form a single group (e.g., the Wi-Fi direct group) as shown in 401. In addition, an owner terminal D 40 and a client terminal C 30 may be formed as another single group as shown in 403.

While the owner terminal A 10 and the client terminal C 30 form a different group, an event for connecting groups may be generated in order to connect the groups as a single group as shown in 405. The owner client A 10 and the client terminal C 30 may deliver the message including information (e.g., a MAC address of the portable terminal, a MAC list of the portable terminal within the group, the number of the portable terminal within the group, an operation mode of the portable terminal within the group (e.g., a group owner terminal, a group client terminal, a normal terminal), the currently operating channel, a random intent value to determine the group owner terminal, a new group generation flag, an encryption information used in the current group, and the number of the terminal which is connectable to the owner terminal, etc.) of a different group to another terminal of its own group (e.g., a client terminal B 20, an owner terminal D 40).

The terminal of the group (e.g., the owner terminal D 40) to which the client terminal C 30 belongs may recognize that a new owner terminal (e.g., the owner terminal A 10) has been generated through the received message, and may attempt a connection to the owner terminal A 10.

The owner terminal A 10 may recognize the terminal (e.g., the client terminal C 30, the owner terminal D 40) that will be newly connected to the owner terminal A 10 itself by using the information of group to which the client terminal C 30 belongs received through a short range communication.

The owner terminal A 10 may deliver the new group generation progress message. In addition, the owner terminal A 10 may notify each terminal that the owner terminal A 10 is in the process of generating a new group through the new group generation flag. Further, even though the new terminal or the group requests for the connection through the event for group connection, through the flag, the new terminal or the group may notify the corresponding terminal that the new group is in process of the generation, and may restrict the connection. This is to block the new group generation operation corresponding to the event for the group connection from another group or another terminal during the new group generation procedure.

When the new group 409 generation is completed, the owner terminal A 10 may notify each terminal (e.g., the client terminal B 20, the client terminal C 30, the owner terminal D 40) that the new group generation is completed by delivering the new group generation completion message. Each terminal may perform a group reset after receiving the group generation completion message from the owner terminal A 10. In addition, each terminal may disconnect to the terminal that is not responsive in the master group or the slave group, and connects to the new group according to the number of the connectable terminals received from the owner terminal A 10 at the time of the group reset.

The owner terminal D 40 may be operated as the client terminal instead of the owner terminal because the owner terminal D 40 should be connected to the new group to which the owner terminal A 10 belongs. In addition, the owner terminal A 10, the client terminal B 20, the client terminal C 30, and the client terminal D 40 may form a new group 409 to communicate by the Wi-Fi direct.

Figure 5:
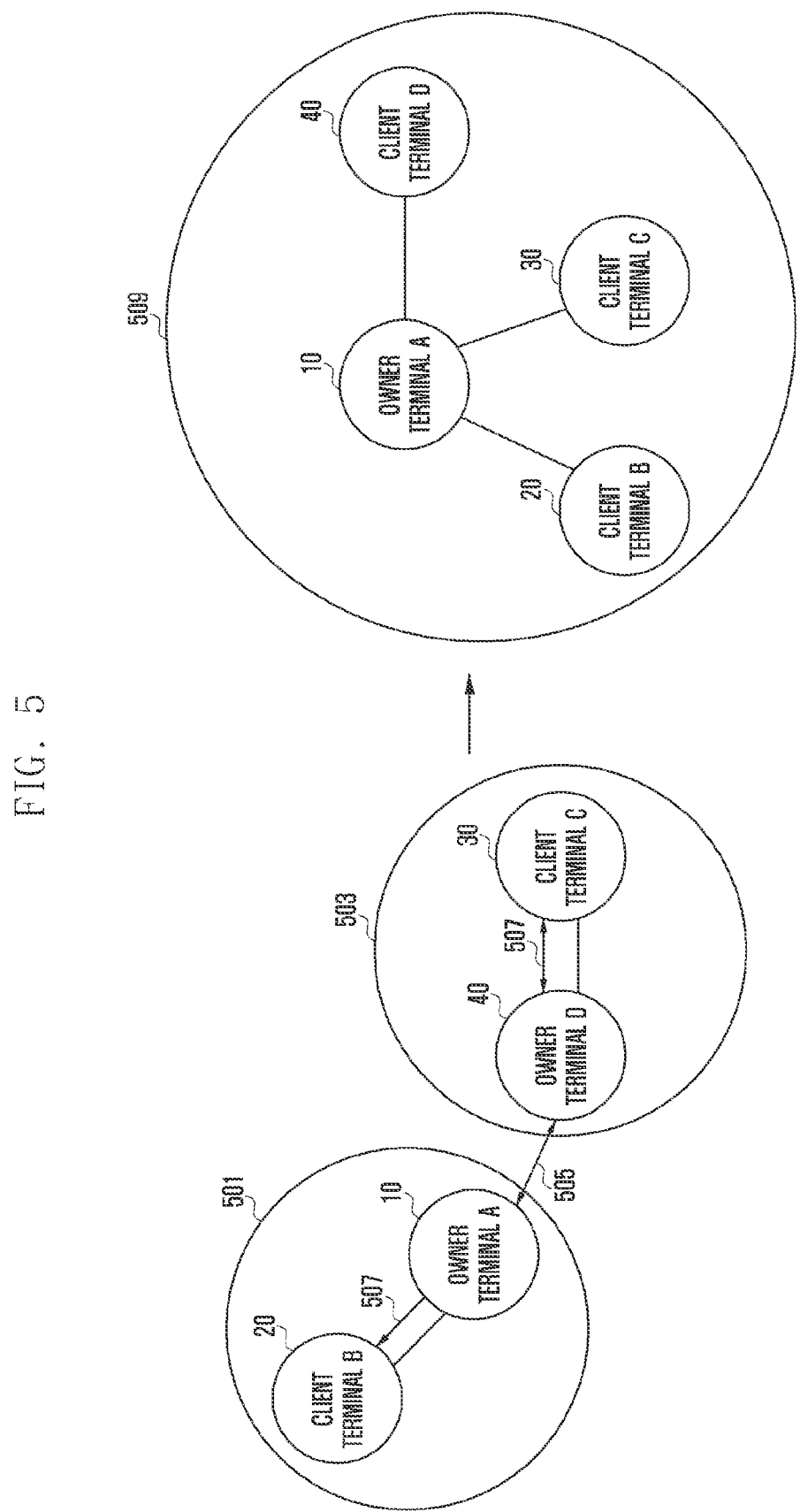

FIG. 5 is a diagram illustrating a case in which a connection is formed between groups in a group formation state according to an embodiment of the present disclosure.

Referring to FIG. 5, in order to form a connection between the groups, one of two groups may be determined as a master group to accept the connection to a slave group.

In the case illustrated in FIG. 5, it may be necessary to determine the master group because the short range communication is performed between the owner terminals. The master group determination may be achieved by comparing information (e.g., the number of terminals of a group, a random intent value) between the groups.

The owner terminal A 10 and the client terminal B 20 may form a single group as shown in 501. In addition, the owner terminal D 40 and the client terminal C 30 may form another single group as shown in 503.

An event for group connection may be generated as shown in 505 in order to form a connection as a single group while the owner terminal A 10 and the owner terminal D 40 may form a different group respectively. The owner terminal A 10 and the owner terminal D 40 may deliver message including different group information to another terminal (e.g., the client terminal B 20, the client terminal C 30) of its own group as shown in 507.

The owner terminal of each group (e.g., the owner terminal A 10, the owner terminal D 40) may compare information between the groups in order to determine the master group. When comparing information between the groups, first, it is possible to compare the number of terminals that belong to each group. By comparing the number of terminals, the group which has more terminals may be determined as the master group. This is to increase the connection speed by minimizing the connection number of the terminal when forming a new group.

When the number of the terminals of each group is identical, a group that has the higher value may be determined as the master group by comparing the random intent value. Each terminal may have each random intent value before the event for the group connection is generated.

In the example illustrated in FIG. 5, the owner terminal A 10 is determined as the master group to accept the connection because the random intent value is high when comparing the random intent values in the state in which the number of the terminals of each groups is identical, however, it is not limited thereto.

The owner terminal D 40 may deliver master group information to the terminal of its own group (e.g., the client terminal C 30). The terminal to which the owner terminal D 40 belongs may recognize that the master group has been formed through the received information, and may attempt the connection to the owner terminal A 10 which is the owner terminal of the master group.

The owner terminal A 10 may recognize the terminal (e.g., the client terminal C 30, the owner terminal D 40) that will be newly connected to the owner terminal itself by using information of group to which the owner terminal D 40 belongs that is received through the event for group connection.

The owner terminal A 10 may deliver a new group generation progress message to the group terminal that requested the connection to the terminal within the group. In addition, the owner terminal A 10 may notify each terminal that the new group is in process of generation through the new group generation flag. Further, through the flag, even though the new terminal or the group requests for the connection through the event for short distance communication, the owner terminal A 10 may notify the corresponding terminal that the new group is in process of the generation, and may restrict the connection. This is to block the new group generation operation corresponding to the event for the group connection from another group or another terminal during the new group generation procedure.

The owner terminal A 10 may notify each terminal (e.g., the client terminal B 20, the client terminal C 30, the owner terminal D 40) that new group generation is completed by delivering new group generation completion message to each terminal when a new group 509 generation is completed. Each terminal may perform the group reset after receiving the new group generation completion message from the owner terminal A 10. In addition, each terminal may disconnect to the terminal that is not responsive in the master group or the slave group according to the number of the connectable terminals received from the owner terminal A 10 at the time of the group reset, and may connect to the new group.

The owner terminal D 40 may be operated as the client terminal instead of the owner terminal, because it should be connected to the new group to which the owner terminal A 10 belongs. In addition, the owner terminal A 10, the client terminal B 20, the client terminal C 30, and the client terminal D 40 may form the new group 509, and may communicate by using the Wi-Fi direct.

Figure 6:
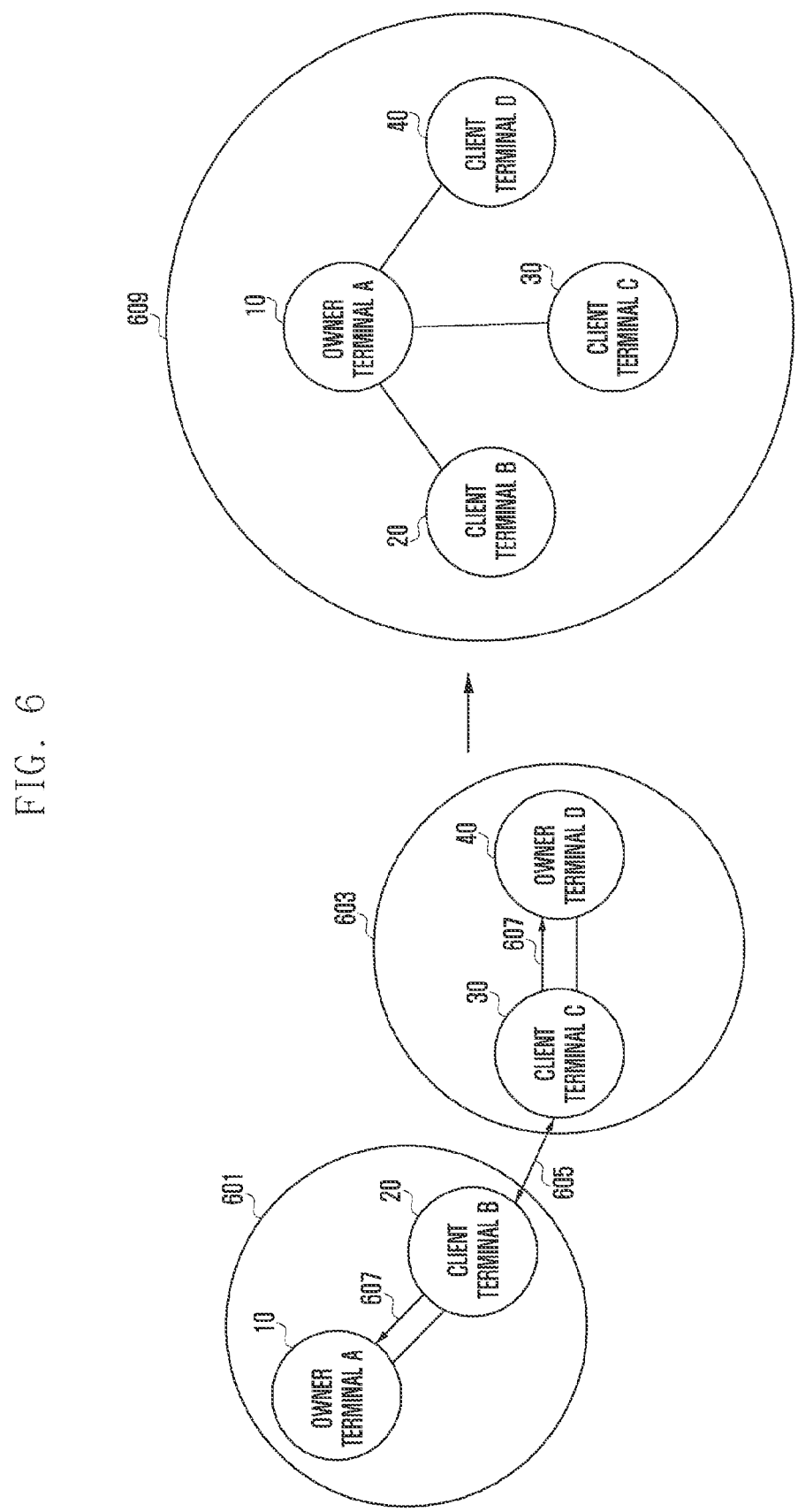

FIG. 6 is a diagram illustrating a case in which a connection is formed between groups in a group formation state according to an embodiment of the present disclosure.

Referring to FIG. 6, in order to form a connection between the groups, one of two groups is determined as the master group to accept the connection of the slave group.

In the case illustrated in FIG. 6, it may be necessary to determine the master group because the short range communication is performed between the client terminals. The master group determination may be achieved by comparing information of each group (e.g., the number of terminals of group, a random intent value).

The owner terminal A 10 and the client terminal B 20 may form a single group as shown in 601. In addition, the owner terminal D 40 and the client terminal C 30 may form another single group as shown in 603.

While the client terminal B 20 and the client terminal C 30 may form a different group, the event for the group connection as shown in 605 may be generated in order to form a connection of a single group. The client terminal B 20 and the client terminal C 30 may deliver the message including information of different group to another terminal of their own group (e.g., the owner terminal A 10 and the owner terminal D 40) as shown in 607.

The client terminal of each group (e.g., the client terminal B 20 and the client terminal C 30) may compare information of each group to determine the master group. When comparing the information of each group, first, the number of the terminals that belong to each group may be determined. By comparing the number of the terminals, the group that has more terminals may be determined as the master group. This is to increase the connection speed by minimizing the connection number of the terminals when forming a new group.

When the number of the terminals of each group is identical, the group that has higher value may be determined as the master group by comparing the random intent value. Each terminal may have each random intent value before the event for the group connection is generated.

In the example illustrated in FIG. 6, the client terminal B 20 is determined as the master group, because the client terminal B 20 has a higher the random intent value when comparing the random intent value in the state in which the number of the terminals of each group is identical, and accepts the connection; however, embodiments of the present disclosure are not limited thereto.

The client terminal B 20 which is determined as the master group may transmit information of the newly connected terminal (e.g., the client terminal C 30, the owner terminal D 40) to the owner terminal A 10. The owner terminal 10 may automatically accept the connection request of the terminals according to corresponding information.

The client terminal C 30 may deliver master group information to another terminal (e.g., the owner terminal D 40) of its own group. In addition, the terminal of the group to which the client terminal C 30 belongs may recognize that the master group has formed through the received information, and may attempt the connection to the owner terminal A 10 which is the owner terminal of the master group.

The owner terminal A 10 may deliver the group generation progress message to the terminal of the group that requested the connection and another terminal of its own group. In addition, the owner terminal A 10 may notify each terminal that the new group is in process of the generation through the new group generation flag. Further, even though the new terminal or group requests for the connection through the event for short distance communication, the owner terminal A 10 may notify the corresponding terminal that the new group is in process of the generation through the flag, and may restrict the connection. This is to block the new group generation operation of another group or another terminal corresponding to the event for the group connection during the new group generation procedure.

When the new group 609 generation is completed, the owner terminal A 10 may indicate that the new group generation is completed by delivering the new group generation completion message to each terminal (e.g., the client terminal B 20, the client terminal C 30, the owner terminal D 40). Each terminal may receive the new group generation completion message from the owner terminal A 10, and may perform the group reset. The owner terminal D 40 may be operated as the client terminal instead of the owner terminal, because the owner terminal D 40 should be connected to the new group to which the owner terminal A 10 belongs. In addition, the owner terminal A 10, the client terminal B 20, the client terminal C 30, the client terminal D 40 may form the new group 609 to communicate by using the Wi-Fi direct.

Figure 7:
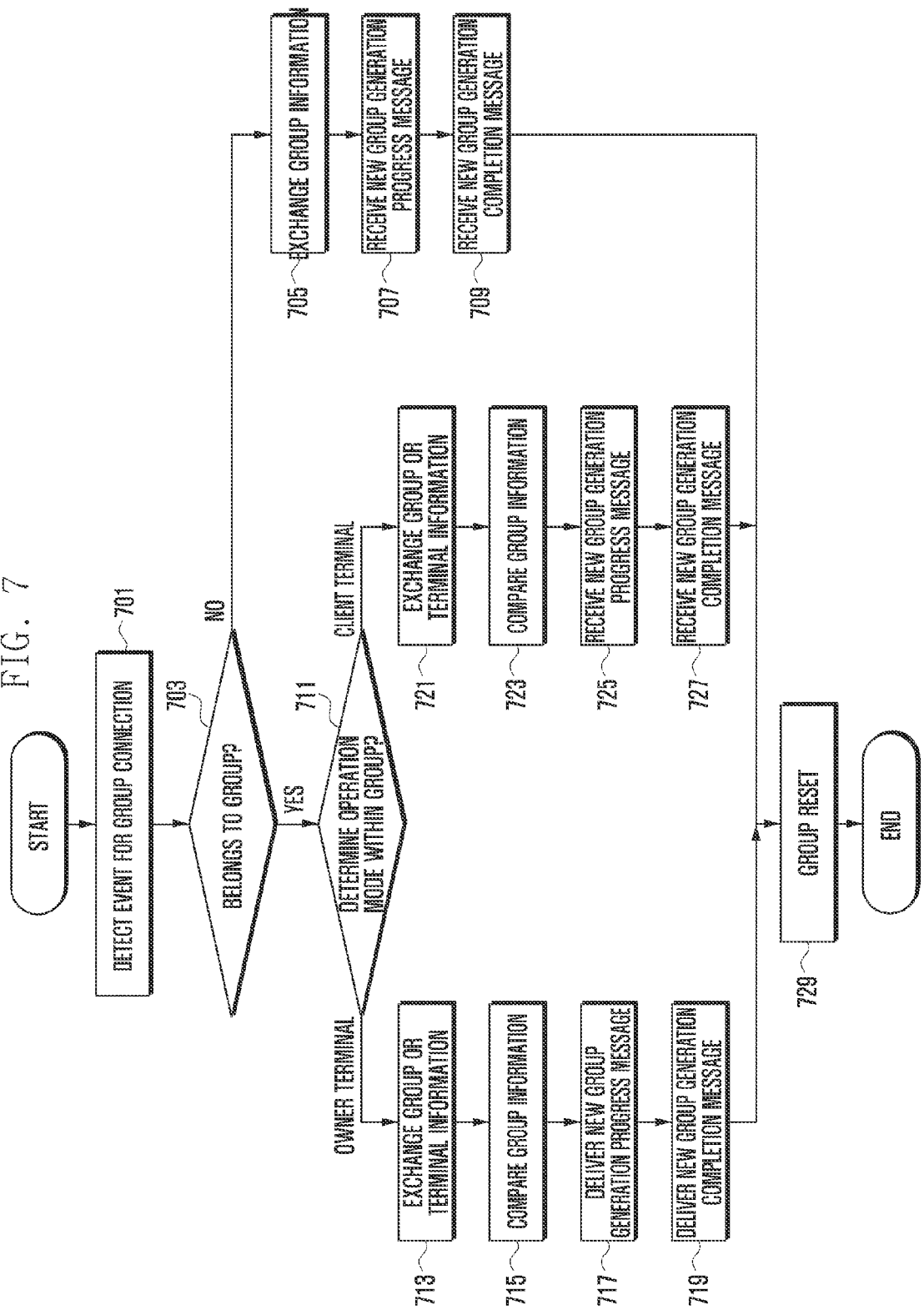
FIG. 7 is a flowchart illustrating an operation of a portable terminal in a group formation state according to an embodiment of the present disclosure.

FIG. 7 is a flowchart illustrating an operation of a portable terminal in a group formation state according to an embodiment of the present disclosure.

Referring to FIG. 7, the controller 140 may detect an event for a group connection at operation 701. The event for the group connection may be an NFC, a BLE, and the like.

At operation 703, when the event for the group connection is detected, the controller 140 may determine whether the terminal of the controller 140 belongs to a group. When the terminal of the controller 140 does not belong to the group, the controller 140 may exchange group information at operation 705. For example, the controller 140 may recognize a MAC list within the group, the number of the portable terminals within the group, an operation mode of a portable terminal within the group (e.g., a group owner terminal, a group client terminal, a normal terminal), a currently operating channel, a random intent value to determine a group owner terminal, a new group generation flag, an encryption information used in a current group, the number of the terminals that is connectable to the owner terminal, etc.) through the exchanged group information.

At operation 707, the controller 140 may receive a new group generation progress message from the terminal that belongs to the group. In addition, when the controller 140 receives new group generation progress message, the controller may restrict the connection through the event for the group connection from another terminal or the group through the new group generation flag. The flag is to block a new group generation operation of another group or another terminal corresponding to the event for the group connection during the new group generation procedure.

At operation 709, when the new group generation is completed, the controller 140 may receive a new group generation completion message from the terminal that belongs to the group. The controller 140 may connect to the owner terminal of the new group when receiving the new group generation completion message.

At operation 711, the controller 140 may determine the operation mode (e.g., an owner terminal, a client terminal) within the group when the terminal of the controller 140 belongs to the group at operation 703.

At operation 713, the controller 140 may exchange group or terminal information when the operation mode within the group is the owner terminal. In addition, the controller 140 may deliver the exchanged group information to the terminals within the group. The controller 140 may communicate by using the Wi-Fi direct instead of delivering group information through the event for the group connection when delivering group information to the terminals within the group.

At operation 715, the controller 140 may compare group information to determine the master group. When comparing the information of each group, the controller 140 may perform a comparison with respect to the terminal where the event for the group connection is detected. The information comparison between the groups may be achieved by comparing an operation mode of each terminal within the group, and the group to which the owner terminal belongs may be determined as the master group. However, when the event for the group connection is detected from the owner terminal of another group, the controller 140 may compare the number of the terminals within the group, and the group that has the higher value may be operated as the master group by comparing the random intent value of the owner terminal when the number of the terminals is identical. The master group is a group that may accept the connection when forming a connection between the groups. In addition, when group information comparison is completed, the controller 140 may deliver the determined master group information to each group.

At operation 717, when being determined as the master group, the controller 140 may deliver the new group generation progress message to the group to which the terminal where the event for the group connection with the terminal within the group is detected belongs. The controller 140 may restrict the connection by another terminal in the new group generation procedure through the flag when generating a new group. This is to block a new group generation operation of another group or another terminal corresponding to the event for the group connection during the new group generation procedure.

At operation 719, when the new group generation is completed, the controller 140 may deliver the new group generation completion message to the terminals that belong within the group. The controller 140 may deliver the new group generation completion message to the group where the event for the group connection is detected as well as to the terminal that belongs to the group.

At operation 721, the controller 140 may exchange group or terminal information when the operation mode within the group is the client terminal. The controller 140 may deliver the exchanged information to the terminals that belong to the group. In addition, the controller 140 may deliver information to the owner terminal within the group while notifying the terminal requesting for the connection.

At operation 723, the controller 140 may compare group information to determine the master group. When comparing the information of each group, the controller 140 may perform a comparison with respect to the terminal where the event for the group connection is detected. The information comparison between the groups may be achieved by comparing operation mode of each terminal within the group, and the group to which the owner group belongs may be determined as the master group. However, when the event for the group connection is detected from another group owner terminal, the controller 140 may compare the number of the terminals within the group, and, when the number of the terminals is identical, the group that has higher value may be operated as the master group by comparing the random intent value of the owner terminal. In addition, when group information comparison is completed, the controller 140 may deliver determined master group information to each group.

At operation 725, the controller 140 may receive the new group generation progress message from the owner terminal within the group. The controller 140 may restrict the connection of another terminal in the procedure of the new group generation through the flag when generating a new group. This is to block a new group generation operation of another group or another terminal corresponding to the event for the group connection during the new group generation procedure.

At operation 727, the controller 140 may receive the new group generation completion message from the terminal that belongs to the group when the new group generation is completed. When receiving the new group generation completion message, the controller 140 may connect to the owner terminal of the new group.

At operation 729, the controller 140 may perform the group reset. The group reset of the present disclosure is to maintain the existing connection when connecting to the new group, and to connect to the newly connectable terminal. In addition, the controller 140 may disconnect to the terminal that is not responsive in the master group or the slave group according to the number of the connectable terminals received from the owner terminal at the time of the group reset, and may connect the new group. The controller 140 may form a new group and a connection by using the Wi-Fi direct. The controller 140 may perform the corresponding operation according to the terminal operation within the group when forming the new group.

Figure 8:
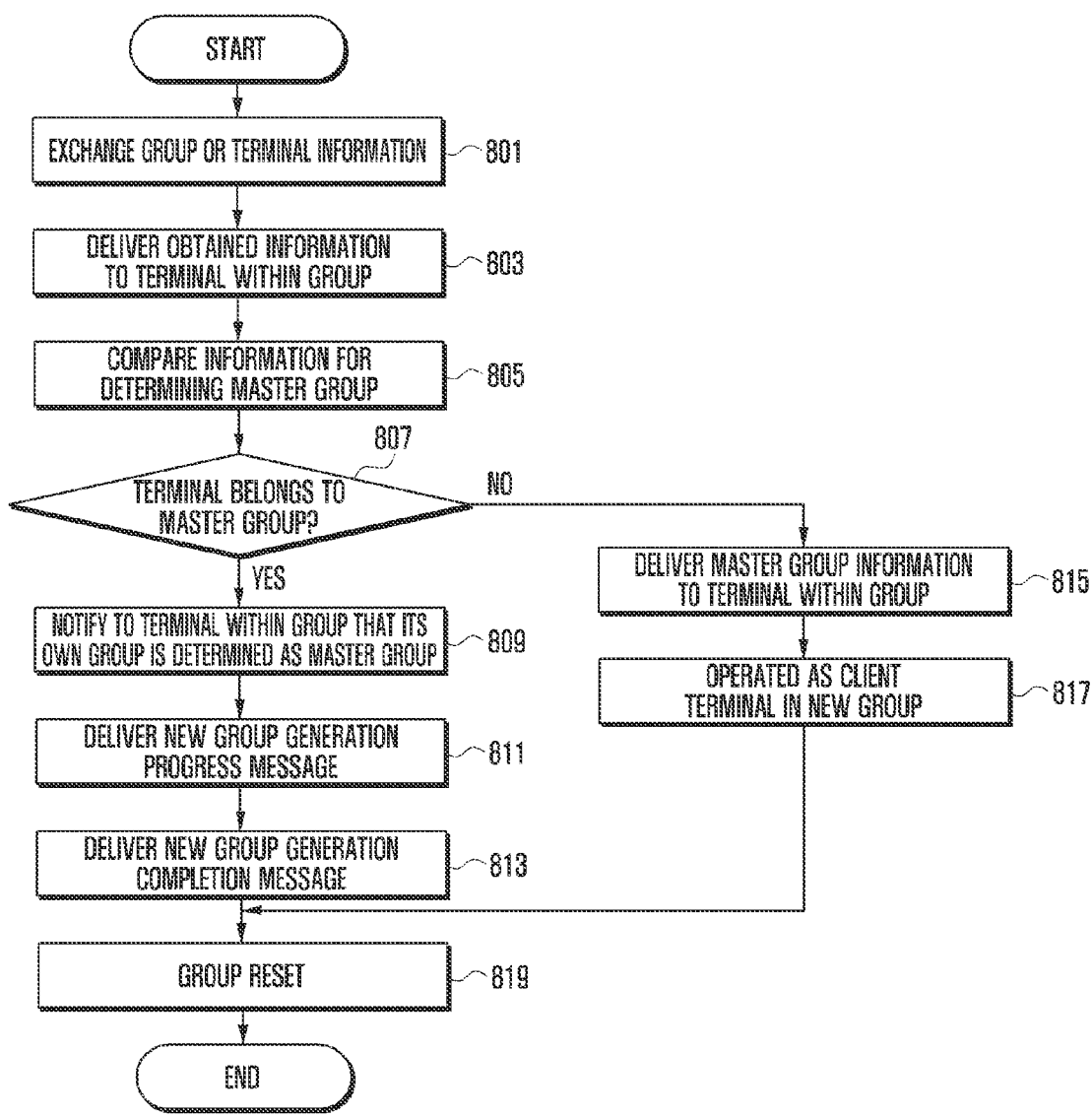
FIG. 8 is a flowchart illustrating an operation of an owner terminal in a group formation state according to an embodiment of the present disclosure.

FIG. 8 is a flowchart illustrating an operation of an owner terminal in a group formation state according to an embodiment of the present disclosure.

Referring to FIG. 8, at operation 801, the controller 140 may exchange group or terminal information requesting the connection. The controller 140 may obtain the group or terminal information through the event for the group connection, or may obtain the group or terminal information requesting the connection from the client terminal within the group.

At operation 803, the controller 140 may deliver the obtained information to the terminal that belongs to the group when obtaining the information through the event for the group connection. When the controller 140 obtains the group or terminal information from the client terminal within the group, this operation may be omitted.

At operation 805, the controller 140 may compare information for determining the master group by using the obtained group or terminal information. The information comparison to determine the master group may be achieved by comparing the operation mode of each terminal within the group, and the group to which the owner terminal belongs may be determined as the master group. However, when the event for the group connection is detected from another group owner terminal, the controller 140 may compare the number of the terminals within the group, and, when the number of the terminals is identical, the group that has higher value may be operated as the master group by comparing a random intent value of the owner terminal.

At operation 807, the controller 140 may determine whether the group to which the terminal belongs is the master group. For example, when a comparison between the owner terminals is performed in order to determine the master group, one owner terminal may be operated as the owner terminal that belongs to the master group whereas another owner terminal may belong to the new group to be operated as the client terminal.

At operation 809, in case of the master group, the controller 140 may notify the terminal within the group that its own group is determined as the master group.

At operation 811, the controller 140 may deliver the new group generation progress message. When delivering the new group generation progress message, the controller 140 may deliver the message to all of the terminals within the group and the terminal that belongs to the group requested for the connection. When the new group generation progress message is delivered, the controller 140 may restrict the group connection request from another terminal during the new group generation through the new group generation flag. This is to block the new group generation operation of another group or another terminal corresponding to the event for the group connection during the new group generation procedure.

At operation 813, when the new group generation is completed, the controller 140 may deliver the new group generation completion message to the terminal within the group and the terminal that belongs to the group requested for the connection. When delivering the new group generation completion message, the controller 140 may deliver the message by using Wi-Fi direct.

At operation 815, if the group is not the master group, the controller 140 may deliver master group information to the terminal within the group, and may attempt the connection.

At operation 817, the controller 140 may be operated as the client terminal in the new group.

At operation 819, the controller 140 may perform the group reset. In addition, the controller 140 may disconnect to the terminal that is not responsive in the master group or the slave group according to the number of the connectable terminals at the time of the group reset, and may connect to the new group.

Figure 9:
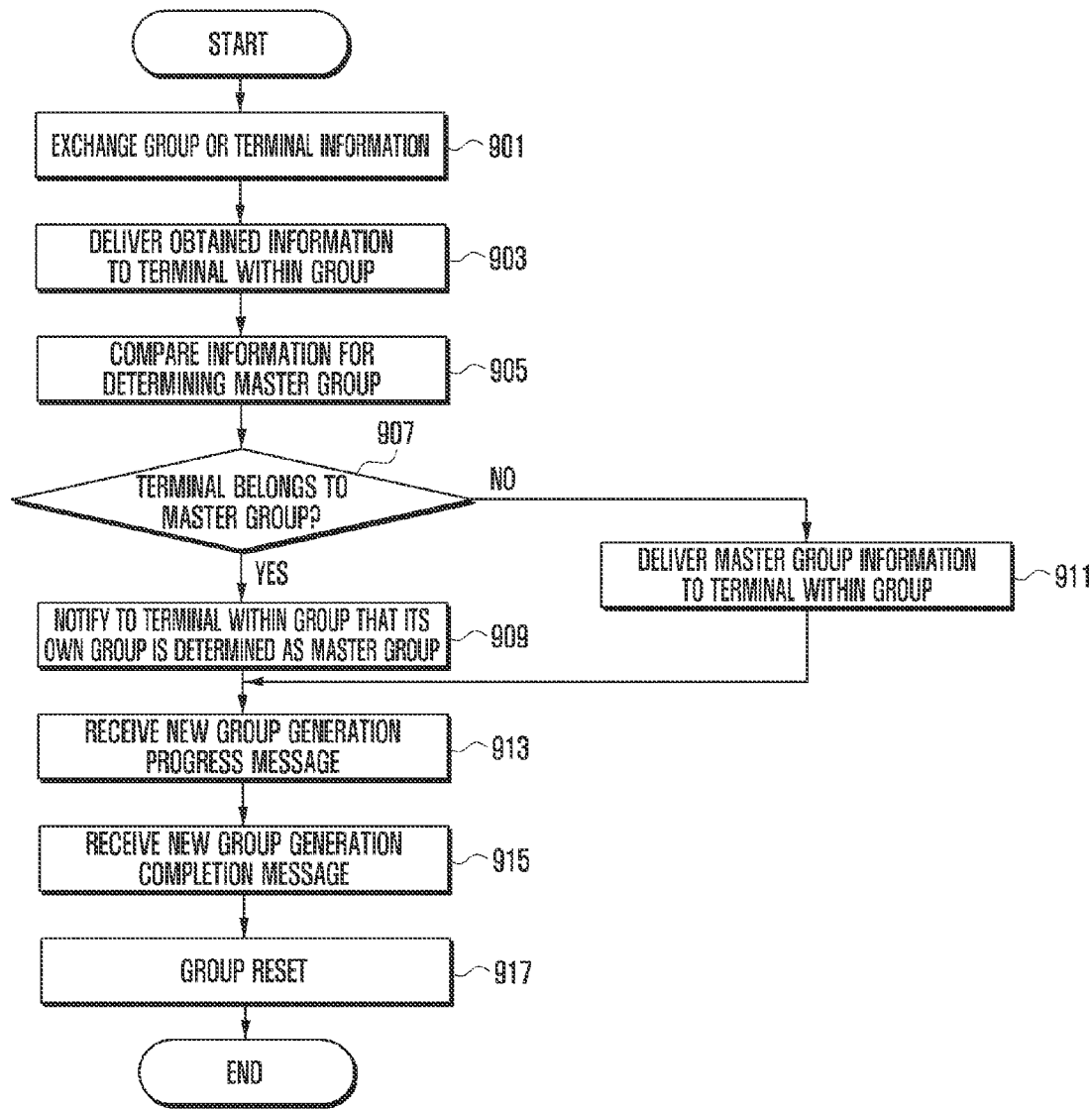
FIG. 9 is a flowchart illustrating an operation of a client terminal in a group formation state according to an embodiment of the present disclosure.

FIG. 9 is a flowchart illustrating an operation of a client terminal in a group formation state according to an embodiment of the present disclosure.

Referring to FIG. 9, at operation 901, the controller 140 may exchange group or terminal information requesting the connection. The controller 140 may obtain the group or terminal information through the event for the group connection, or may obtain the group or terminal information requesting the connection from the owner terminal within the group.

At operation 903, when the controller 140 obtains the group or terminal information through the event for the group connection, the controller 140 may deliver the obtained information to the terminal that belongs to the group. When the controller 140 obtains the information through the event for the group connection, the controller 140 may deliver information of terminal requesting the connection to the owner terminal within the group and information of the group to which the terminal belongs. When the controller 140 obtains the group or terminal information from the owner terminal within the group, this operation may be omitted.

At operation 905, the controller 140 may compare information for determining the master group by using the obtained group or terminal information. The information comparison for the master group determination is achieved by comparing operation mode of each terminal within the group to determine the group to which the owner terminal belongs as the master group. However, when the event for the group is detected from the owner terminal of another group, the controller may compare the number of the terminals within the group, and, when the number of the terminals is identical, the group that has higher value may be operated as the master group by comparing a random intent value of the owner terminal.

At operation 907, the controller 140 may determine whether the group to which the terminal belongs is the master group.

At operation 909, in a case of the master group, the controller 140 may notify the terminal within the group that its own group is determined as the master group. The controller 140 may deliver information of the newly connectable terminal to the owner terminal of the group.

At operation 911, when the group of the terminal is not the master group, the controller 140 may deliver master group information to the terminal within the group.

At operation 913, the controller 140 may receive the new group generation progress message from the owner terminal. The controller 140 may restrict the group connection request from another terminal during the new group generation through the new group generation flag.

At operation 915, the controller 140 may receive the new group generation completion message from the owner terminal. The controller 140 may receive the new group generation completion message through the Wi-Fi direct.

At operation 917, the controller 140 may perform the group reset when receiving the new group generation completion message. In addition, at the time of the group reset, the controller 140 may disconnect to the terminal that is not responsive in the master group or the slave group according to the number of the connectable terminals received from the owner terminal, and may connect to a new group, and may perform an operation according to the formation of the group. The controller 140 may form the new group with a connection of the Wi-Fi direct.

As described above, embodiments of the present disclosure may expand a group connection through a group connection event with a terminal without disconnecting to an existing group connection in a group state, and may easily form a group through a group connection event with respect to a connection between groups as well as a connection between terminals.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for a Wi-Fi direct connection, the method comprising:
    detecting an event for a group connection between a plurality of groups, each including a plurality of terminals;
    determining whether a terminal belongs to a first group of the plurality of groups when the event for group connection is detected;
    determining an operation mode within the first group when the terminal belongs to the first group;
    exchanging group information between the plurality of groups according to the determined operation mode within the first group;
    comparing the exchanged information;
    generating a new group according to the operation mode within the first group based on the compared information; and
    connecting the new group through a group reset while maintaining an existing connection according to an operation mode within the new group when the new group generation is completed.

2. The method of claim 1, wherein the determining of the operation mode within the first group comprises determining whether the operation mode within the first group is an owner terminal or a client terminal.

3. The method of claim 1, wherein the exchange of the group information or the terminal information comprises exchanging information of the terminal where the event for the group connection is detected or information of the first group to which the terminal belongs.

4. The method of claim 1, wherein the comparing of the exchanged information comprises comparing group information for determining a master group for a group connection.

5. The method of claim 4, wherein the master group is a group to accept a connection to the terminal or a terminal of a group which will be newly connected when generating a new group.

6. The method of claim 4, wherein the determining of the master group comprises, when being determined as the master group, operating an existing owner terminal as an owner terminal of the master group, and operating another owner terminal that will be connected to the master group as a client terminal of the master group.

7. The method of claim 1, wherein the generating of the new group comprises delivering a new group generation progress message to a terminal that is previously connected and a terminal that will be newly connected when generating the new group, when the operation mode within the first group is the owner terminal.

8. The method of claim 1, wherein the generating of the new group comprises delivering the compared information to an owner terminal within the new group, and receiving the new group generation progress message from the owner terminal of a master group, when the operation mode within the first group is the client terminal.

9. The method of claim 8, wherein the client terminal restricts a connection of another group or another terminal by using a flag when receiving the new group generation progress message.

10. The method of claim 9, wherein the flag is to block a new group generation operation of another group or another terminal corresponding to an event for the group connection during the new group generation procedure.

11. The method of claim 1, wherein the connecting of the new group comprises delivering the new group generation completion message to a previously connected terminal and a terminal which will be newly connected, if the new group generation is completed, when the operation mode within the new group is the owner terminal.

12. The method of claim 1, wherein the connecting of the new group comprises receiving the new group generation completion message from the owner terminal when the operation mode within the new group is the client terminal.

13. The method of claim 1, wherein the connecting of the new group comprises disconnecting to a terminal that is not responsive in a master group or a slave group according to the number of the connectable terminals received from the owner terminal at the time of the group reset, and connecting to the new group.

14. The method of claim 1, wherein the group reset comprises forming the new group by maintaining an existing group connection through the group reset, and connecting to the terminal which will be newly connected.

15. An apparatus for a Wi-Fi direct connection, the apparatus comprising:
 a wireless LAN interface configured to form the Wi-Fi direct connection between portable terminals;
 a short distance communication interface configured to detect an event for a group connection;
 at least one processor configured to:
  detect the event for the group connection between a plurality of groups, each including a plurality of terminals,
  exchange group information between the plurality of groups when the event is detected,
  compare the exchanged information for determination of a master group,
  generate a new group when the master group is determined, and
  connect the new group through a group reset while maintaining an existing connection according to an operation mode within the new group when the new group generation is completed.

16. The apparatus of claim 15, wherein the at least one processor is further configured to determine whether an operation mode within the group is operated as an owner terminal or a client terminal when the event for the group connection is detected.

17. The apparatus of claim 15, wherein the at least one processor, when being determined as the master group, is further configured to:
 operate the existing owner terminal as the owner terminal of the master group, and
 operate another owner terminal that will be connected to the master group as a client terminal of the master group.

18. The apparatus of claim 15, wherein the at least one processor is further configured to block a new group generation operation of another group or another terminal corresponding to the event for the group connection through a flag when generating the group.

19. The apparatus of claim 15, wherein, when the group generation is completed, the at least one processor is configured to form a new group by maintaining the existing group connection through a group reset, and connecting to the terminal which will be newly connected.

20. The apparatus of claim 15, wherein the at least one processor is further configured to:
 disconnect a group connection to the terminal that is not responsive in the master group or the slave group according to the number of the connectable terminals delivered from the owner terminal at the time of the group reset, and
 connect to the new group.

* * * * *